United States Patent [19]

Burns

[11] Patent Number: 5,685,686

[45] Date of Patent: Nov. 11, 1997

[54] ARTICLE-CARRYING RACK AND MOUNT FOR MOUNTING THE SAME

[75] Inventor: John Burns, Eureka, Calif.

[73] Assignee: Yakima Products, Arcata, Calif.

[21] Appl. No.: 620,897

[22] Filed: Mar. 22, 1996

[51] Int. Cl.⁶ ............................................. B60R 9/10
[52] U.S. Cl. .................. 414/462; 224/282; 224/519; 224/521; 280/506; 403/374
[58] Field of Search .................. 224/282, 488, 224/495, 504, 519, 521, 536, 546, 553, 558; 280/288.4, 186, 769, 506; 285/421; 403/374, 409.1; 414/462, 917

[56] References Cited

U.S. PATENT DOCUMENTS

| | | |
|---|---|---|
| 2,492,841 | 12/1949 | Burkey . |
| 2,767,676 | 10/1956 | Johnson et al. . |
| 3,194,467 | 7/1965 | Goonan et al. . |
| 3,198,562 | 8/1965 | Smith ............................ 403/374 X |
| 3,263,058 | 7/1966 | Goonan . |
| 4,400,129 | 8/1983 | Eisenberg et al. .............. 414/462 |
| 4,456,421 | 6/1984 | Robson ........................... 414/546 |
| 5,108,018 | 4/1992 | Spinka . |
| 5,181,822 | 1/1993 | Allsop et al. ................... 414/462 |
| 5,190,195 | 3/1993 | Fullhart et al. . |
| 5,232,133 | 8/1993 | Speer . |
| 5,244,133 | 9/1993 | Abbott et al. .................. 224/521 |
| 5,303,857 | 4/1994 | Hewson ....................... 224/536 X |
| 5,330,084 | 7/1994 | Peters . |
| 5,330,312 | 7/1994 | Allsop et al. ................... 414/462 |
| 5,333,888 | 8/1994 | Ball ................................ 280/504 |
| 5,344,175 | 9/1994 | Speer ............................. 280/506 |
| 5,373,978 | 12/1994 | Buttchen et al. . |
| 5,423,566 | 6/1995 | Warrington et al. ......... 280/415.1 |
| 5,443,189 | 8/1995 | Hirschfield ..................... 224/501 |
| 5,527,146 | 6/1996 | Allsop et al. ................... 414/462 |
| 5,529,231 | 6/1996 | Burgess ........................ 224/502 |

Primary Examiner—Janice L. Krizek
Attorney, Agent, or Firm—Kolisch, Hartwell, Dickinson, McCormack & Heuser

[57] ABSTRACT

An articulable, hitch-sleeve-mounted, wobble-resistant, article-carrying rack is movable from an inclined position for carrying articles, to a declined position in which such carried articles may be removed. The rack includes a hitch mount which is insertable into a vehicle's hitch or hitch sleeve and is adapted for engaging the hitch internally thereof for reducing the tendency of the rack to wobble. First and second elongate frame members are pivotally mounted on the hitch mount, and each includes an upper end longitudinally spaced from the hitch mount. The frame members are maintained in a generally parallel relationship with one another. A latch member connects the upper ends of the frame members and locks the frame members in either of the inclined or declined positions. At least one support bar is pivotally mounted on the frame members adjacent the upper ends and extends generally horizontally away therefrom for supporting articles thereon. The support bar maintains its horizontal disposition when the rack is moved between the inclined and declined positions.

24 Claims, 5 Drawing Sheets

ARTICLE-CARRYING RACK AND MOUNT FOR MOUNTING THE SAME

BACKGROUND AND SUMMARY OF THE INVENTION

This invention relates generally to vehicle-mounted, article-carrying racks, and more particularly, it concerns an articulable, wobble-free, hitch-sleeve-mounted, article-carrying rack and hitch mount, wherein the rack is movable relative to the vehicle upon which it is mounted for facilitating the placement and removal of articles thereon, and the hitch mount substantially eliminates the tendency of a rack to wobble due to hitch-mount-shifting within a vehicle's hitch sleeve.

More and more people these days are discovering the outdoors, and the various outdoor activities in which one can participate. Many outdoor activities require the use of various types of articles such as sports equipment and the like. For example, people who enjoy skiing, and who own their own equipment, must usually transport their equipment to a suitable ski area. Similarly, people who enjoy bicycling in areas other than those in which they live, must usually transport their bicycle or bicycles to such areas on a vehicle.

In line with the growing fitness and outdoor trends which have developed, a number of types of so-called support equipment has evolved which enables an individual to transport, on a vehicle, various articles desired to be used in an outdoor setting.

As an example, any number of vehicle-mounted, article-carrying racks such as bicycle racks have been developed for enabling an individual to carry articles on almost any part of a vehicle. There are racks which are roof-mounted, front-mounted, and rear-mounted which enable an individual to carry articles, respectively, on a vehicle roof, front, or rear. There are also racks which are mountable in a truck bed to enable an individual to carry articles therein. Needless to say, there are not too many places one can go anymore, and not see some type of vehicle-mounted rack for carrying articles such as bicycles. Yet, in most of the racks currently available, an individual must physically lift the articles from the ground, an appreciable distance onto the rack. In some cases, as in roof-mounted racks, this distance is quite large and often requires that two people lift an article, such as a bicycle, thereon. In other racks, as in front- or rear-mounted racks, this distance is somewhat less, but still appreciable.

A need exists for a vehicle-mounted, article-carrying rack which is simple and easy to use, and which enables an individual to reduce the distance an article must be moved in order to be placed on the rack. Given that such racks are carried on vehicles which may move at great speeds, such racks must also be safe to use on such vehicles.

Although a number of racks have attempted to solve these problems, the known racks are limited in utility for a number of reasons which include that such are not as simple to use as one might wish, and all such racks have a tendency to wobble uncontrollably when transported on a vehicle.

One such attempt is U.S. Pat. No. 5,181,822 to Allsop et al. which describes an articulated support rack for vehicles which includes a base member for releasably attaching the rack to a vehicle, a pivotally mounted frame on the base member, a support arm on the frame extending horizontally away therefrom which remains substantially horizontal as the frame pivots, and a locking assembly .attached to the base member which includes a pair of lock plates for releasably engaging the frame members and a foot-actuable lever for selectively disengaging the lock plates from the frame members. The locking assembly is located below the bumper top edge so that an individual may actuate it with a foot. The solution proposed by Allsop is undesirable because in order to disengage the lock plates from the frame members, an individual must first access the above-mentioned lever which is below the bumper's top edge. This is not too difficult when the rack is not carrying a load. However, when the rack is loaded down, e.g., carrying a bicycle, an individual wishing to release the rack from its upright position must negotiate past the bicycle to reach the lever which may be cumbersome and awkward. Furthermore, if an individual does not brace the upper part of Allsop's rack when the lever is foot-released, there is a distinct possibility that the rack will come crashing down on the individual's leg and cause injury. Another of the problems associated with Allsop's rack stems from the fact that the rack is releasable from its upright position by virtue of a downward, foot-applied force on the lever. This increases the chances that an individual might accidentally release the rack, as by resting a foot on the lever.

Another problem encountered by vehicle-mounted racks, and one which is not addressed by Allsop's rack, is the tendency of such racks to wobble when carried on a vehicle travelling on a roadway or highway. More to the point, certain types of racks are mountable on a vehicle by using a currently in-place hitch or hitch sleeve. Such sleeves are usually mounted on the rear part of a vehicle, below the bumper, and a majority of the hitch sleeves are tubular and have a square cross-section for accommodating various types hitch mounts such as ones which enable a vehicle to pull a boat trailer, camping trailer and the like. One problem encountered by article-carrying racks and not by the above-mentioned trailers, is the tendency of the racks to wobble due, in part, to the fact that article-carrying racks are not grounded, but rather ride above the ground for carrying a load substantially above the rear bumper. Any tendency of the rack's hitch mount to shift or move laterally within the vehicle's hitch or hitch sleeve is exaggerated by the rack, resulting in an undesirable wobbling condition. This condition is undesirable for a number of reasons, not the least of which are safety concerns. For example, when a rack wobbles, its load (e.g., bicycles, skis, luggage and the like) is subjected to vibrations which may shake parts loose. These parts, if dislodged while traveling on a highway or roadway, present a safety hazard to others on the highway or roadway. Another problem associated with rack wobble is that if parts of the load are shaken loose but not dislodged, then later, when an individual is riding a bicycle, or skiing, such loose parts may present a safety problem for the individual. Additionally, a shifting rack subjects a vehicle's hitch or hitch sleeve to stresses which may, after a while, result in fatigue and failure. Needless to say, there are simply numerous problems associated with the above-described wobbling situation.

One solution is to construct a hitch mount dimensioned for a very tight fit within the hitch sleeve. While this might mitigate the wobbling effects, it creates another problem because the hitch mount will not be as easily inserted into the sleeve. That is, the closer the hitch mount is dimensioned to the sleeve, the more difficult insertion of the mount into the sleeve will become.

Another solution is to construct a hitch mount which wedges interiorly of the hitch sleeve. The solutions proposed thus far, while reducing somewhat the wobble problem, fall short of providing a complete and satisfactory solution. One such solution appears in U.S. Pat. No. 5,423,566 to Warrington et al. which discloses an insert tube which includes a wedge-shaped section which may be displaced in two directions to engage the upper and lower inside surfaces of the hitch sleeve. Warrington's insert tube leaves unencumbered, the internal sides of the hitch sleeve which, in turn, increases the possibility that the rack will shift or become laterally displaced and thereby wobble its load.

Thus, a need exists for a hitch mount which is easy to insert into conventional hitch sleeves, and which substantially reduces the tendency of an article-carrying rack to wobble.

With the above problems in mind, it is a general object of the invention to provide an article-carrying rack which is safe and simple to operate.

It is another object of the invention to provide a vehicle-mounted, article-carrying rack which is movable from an inclined position for carrying articles to a declined position for unloading the carried articles thereby minimizing the distance an individual must lift an article to and from the rack.

It is a further object of the invention to provide such a rack with a simple, safe, and effective release mechanism which allows the rack to be moved from an inclined position for carrying articles to a declined position for unloading the carried articles, wherein the release mechanism eliminates the possibility of an inadvertent release and is positioned on the rack for easy user-accessibility.

It is yet another object of the invention to provide an article-carrying rack with a hitch mount that greatly reduces the tendency of the rack to wobble when mounted on a vehicle thereby providing a rack which is much safer than those currently available, and one which reduces the stresses encountered by a carried load.

The invention achieves these and other objects in the form of an articulable, hitch-sleeve-mounted, wobble-resistant, article-carrying rack which is movable from an inclined position for carrying articles, to a declined position in which such carried articles may be removed.

According to one feature of the invention, the rack includes a hitch mount which is insertable into a vehicle's hitch and adapted for engaging the hitch internally thereof for reducing the tendency of the rack to wobble. A first elongate frame member is pivotally mounted on the hitch mount and includes an upper end longitudinally spaced therefrom. A second elongate frame member is pivotally mounted on the hitch mount and includes an upper end which is longitudinally spaced therefrom. The second frame member is spaced from, and in a generally parallel relationship with the first frame member. A latch member connects the upper ends of the frame members and locks the frame members in either of the inclined or declined positions. At least one support bar is pivotally mounted on the frame members adjacent the upper ends and extends generally horizontally away therefrom for supporting articles thereon. The support bar maintains its horizontal disposition when the rack is moved between the inclined and declined positions.

According to another feature of the invention, an improved latch member for fixing the rack in either of the inclined or declined positions includes plate structure connected adjacent the top or upper ends of the frame members and maintains the frame members in a spaced, generally parallel relationship when the rack is moved from and between the inclined and declined positions. At least one slot in the plate structure defines, in part, an upper extent of the inclined position and a lower extent of the declined position. The upper and lower extents define, respectively, the upper and lower limits to which the rack may be moved. A detent on one of the frame members engages the slot and is configured for selectively locking the rack at either one of the extents when the rack is moved to a corresponding one of the inclined or declined positions.

According to another feature of the invention, a wobble-reducing, expandable hitch mount is adapted for insertion into a vehicle-mounted hitch sleeve which is generally square in transverse cross-section. The hitch mount includes first and second members with plural abutment surfaces. The members are operatively connected for movement relative to one another for bringing the abutment surfaces to bear against the hitch sleeve interior such that each interior hitch sleeve surface is substantially engaged by a respective one of the abutment surfaces.

According to yet another feature of the invention, a wobble-reducing vehicle hitch mount for supporting an article carrier includes an expandable, elongate coupling tube having a generally square transverse cross-section. The tube is adapted for insertion into a complementary-shaped hitch sleeve, and once therein, the tube is expandable for selectively locking the mount in place. The adaptation which allows tube expansion includes a diagonal slice through the tube which divides the tube into two separate parts. The slice commences at one of the tube's corners and terminates at the non-adjacent tube corner. The slice defines a slide plane which is skewed relative to each of the tube's sides, and along which the tube parts may be displaced, relative to one another, interiorly of the hitch sleeve for effectively expanding the mount and engaging, in part, opposite interior hitch sleeve corners. An actuator jointly engages the tube parts and effectuates the tube parts' displacement along the slide plane.

These and additional objects and advantages of the present invention will be more readily understood after a consideration of the drawings and the detailed description of the preferred embodiment.

BRIEF DESCRIPTION OF THE DRAWINGS

FIG. 3A shows an intermediate position between the inclined and declined positions, and FIG. 3B shows the latching mechanism when the rack is in the declined position.

DETAILED DESCRIPTION OF THE PREFERRED EMBODIMENTS

Figure 1:
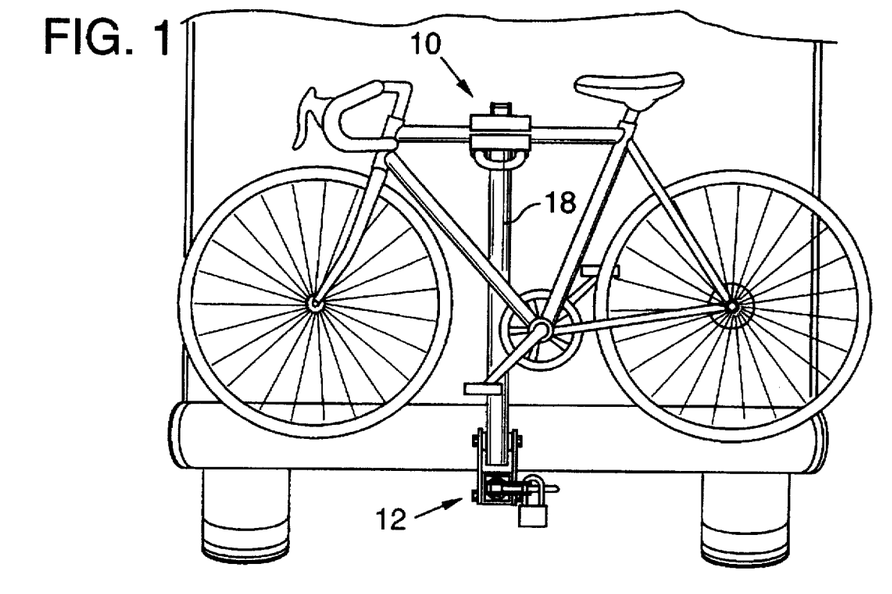
FIG. 1 is an end view of a vehicle upon which an article-carrying rack, constructed according to the present invention, is mounted. An article in the form of a bicycle is shown mounted on the rack.
Figure 2:
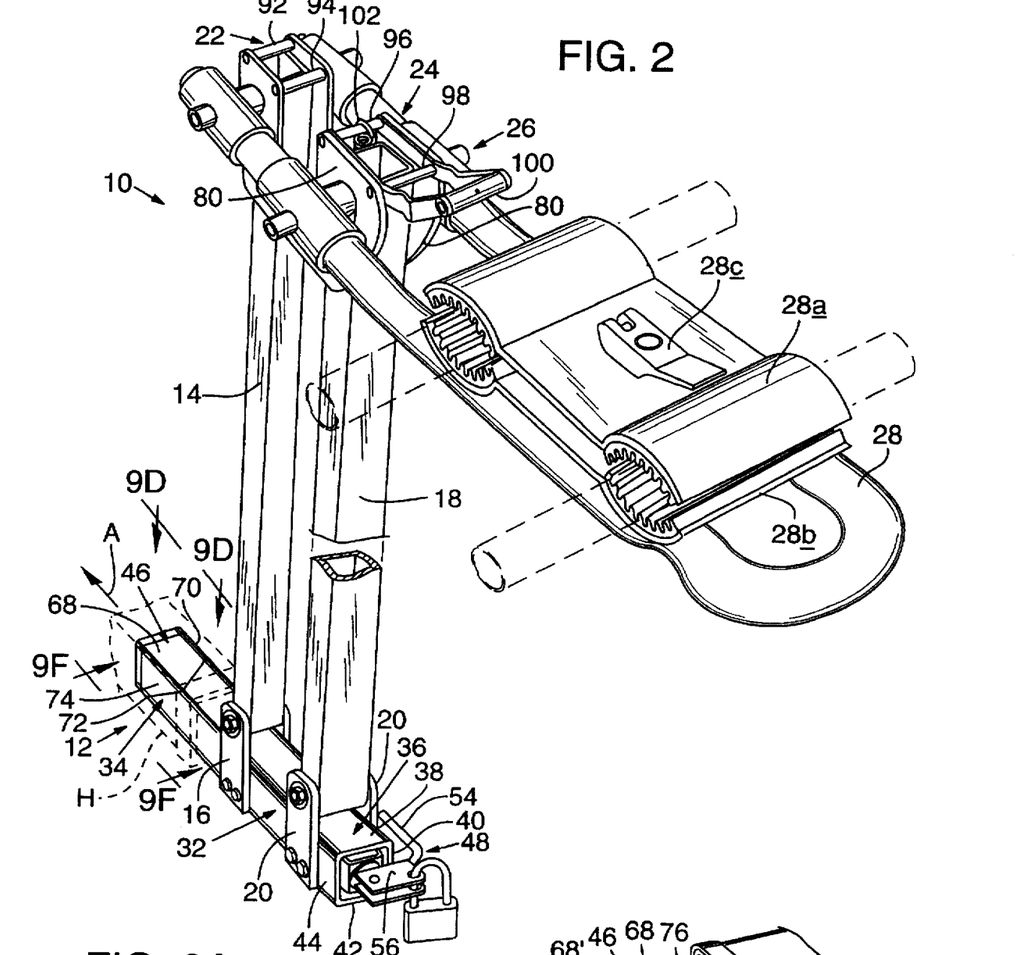
FIG. 2 is an isometric view of the article-carrying rack of FIG. 1 apart from the vehicle with a portion broken away for clarity, and showing a clamping member useful for mounting a bicycle(s) on the rack.
Figures 3, 3A, 3B:
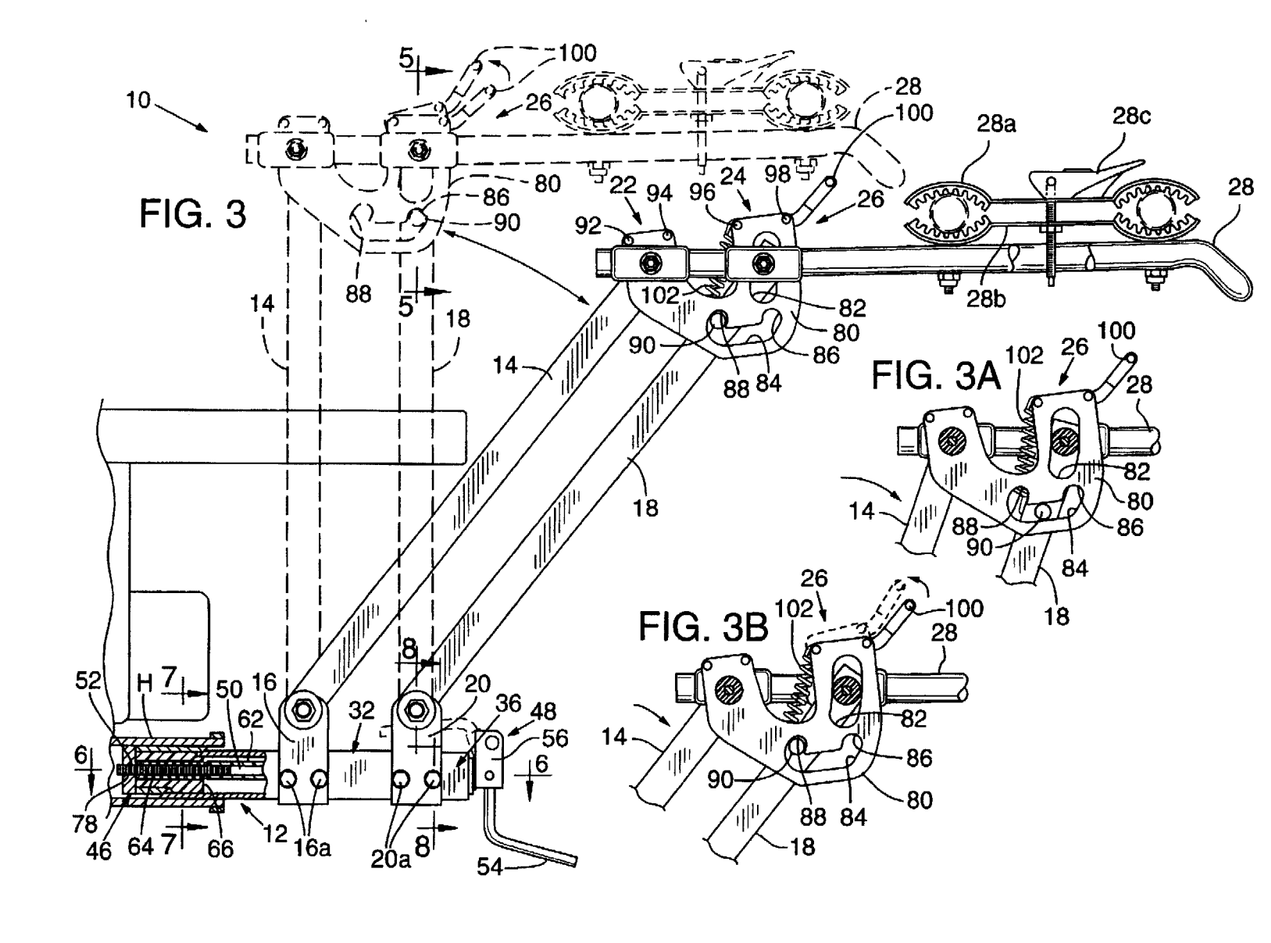
FIG. 3 is a side elevation of the article-carrying rack with a portion of the hitch mount broken away to show detail. The rack is shown in one of two positions, one of which, an inclined position, is shown in phantom, the other of which, a declined position, is shown in solid lines.
FIGS. 3A-3B are both views of the top of the article-carrying rack shown in FIG. 3, showing a portion of a latching mechanism which latches the rack in the inclined and declined positions.

Shown generally at 10 in FIGS. 1–3 is a vehicle-mounted, article-carrying rack constructed according to the preferred embodiment of the present invention.

Rack 10 is articulable from a generally inclined position, shown in FIG. 1 and in phantom in FIG. 3, to a declined position shown in FIG. 3 in solid lines. Rack 10 is mountable on or in a vehicle's so-called hitch sleeve (or hitch as it will be referred to below), a representative one of which is shown at H in FIGS. 2, 3, and 9A and when so mounted, enables articles of various types to be carried thereon from one place to another. Hitch sleeve H is a standard hitch sleeve and is elongate and has a generally square transverse cross-section which is most evident from FIG. 9A. Preliminarily, it will be understood that the present preferred embodiment is described in the context of providing a bicycle-carrying rack, and that the rack is equally well suited for carrying other types of articles, among which are included surf boards, body boards, kayaks, canoes, skis, ski equipment, and luggage to name just a few.

Figure 7:
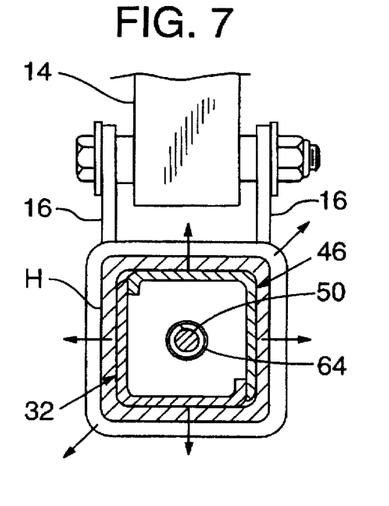
FIG. 7 is a view taken along line 7—7 in FIG. 3.
Figure 8:
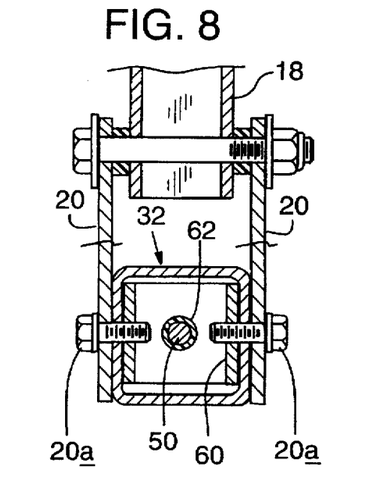
FIG. 8 is a view taken along line 8—8 in FIG. 3.

Turning now to the drawings, and particularly to FIGS. 2 and 3, the reader will see that rack 10 includes a hitch mount 12 which is insertable into hitch sleeve H, and once therein is adapted, as described below, for engaging the hitch internally thereof and reducing the tendency of the rack to wobble when the same is being transported by a vehicle. A first elongate frame member 14 is pivotally mounted on hitch mount 12, via a pair of mounting plates 16, both of which are shown in FIG. 7. Frame member 14 is pivotally mounted on plates 16 by a standard bolt which passes through each plate, suitably captures the frame member and is held in place by a suitable nut as shown in FIG. 7. Spacing washers are provided on either side of the frame member and between each respective plate. First frame member 14 is mounted forwardly (relative to hitch sleeve H) of a second elongate frame member 18 which is pivotally mounted on hitch mount 12 via a similar pair of mounting plates 20, both of which are shown in FIG. 8. Frame member 18 is pivotally mounted by virtue of a standard bolt, nut, and spacing washer combination similar to those mounting frame member 14 to hitch mount 12. Both pairs of mounting plates 16, 18 are suitably fixedly attached to hitch mount 12 by respective pairs of bolts 16a (plates 16) and 20a (plates 20).

Both frame members 14, 18 are preferably hollow and tubular, and constructed from a durable metal such as extruded steel, although any suitable material which is able to withstand the demands of an article-carrying rack may be used. Such materials should possess sufficient strength characteristics such that various types of articles, which might weigh one hundred or more pounds, could be carried by the rack and supported when the rack is moved between the inclined and declined positions, without over-stressing any of the linked connections described above and below. Additionally, each of the preferred frame members has a generally square cross-section taken along each's long axis. A representative cross-section is shown in FIG. 2 where a central portion of frame member 18 has been broken away. It will be appreciated, however, that any suitably cross-sectioned frame members would suffice.

Figure 4:
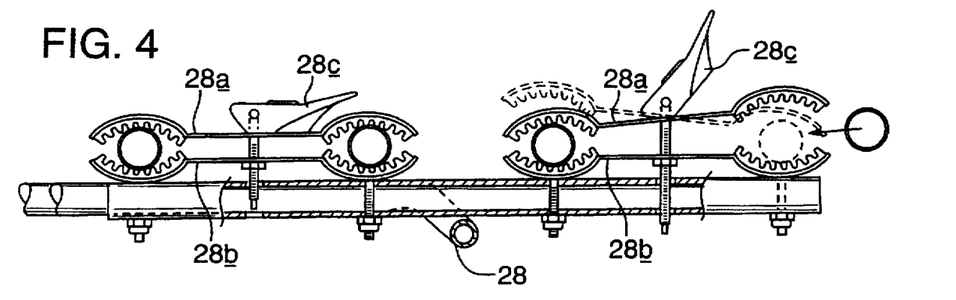
FIG. 4 is a view of rack structure which is capable of supporting and holding one or more bicycles in place on the rack. A rack extension is also shown which allows more than two bicycles to be carried on the rack.
Figure 5:
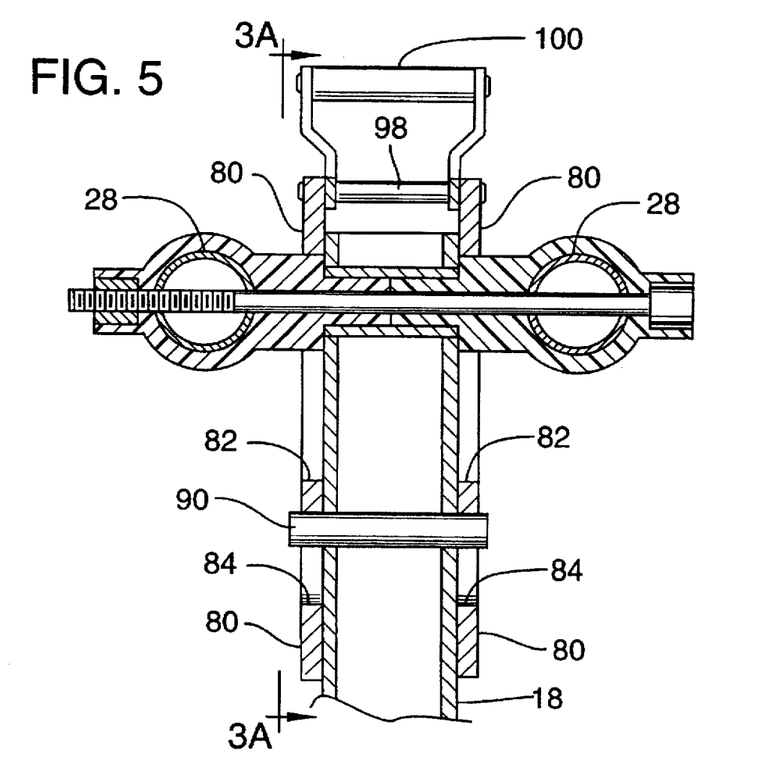
FIG. 5 is a view taken along line 5—5 in FIG. 3.

As shown in FIGS. 2 and 3, each of frame members 14, 18 extends along its own long axis toward a respective top or upper end 22, 24 where a latch member or release mechanism, designated generally at 26, is mounted for locking the frame members in either the inclined position or the declined position in a manner described in more detail below. The latch member also maintains the frame members in a spaced, parallel relationship when the same are moved between the inclined and declined positions which is most evident from FIG. 3. A generally U-shaped support bar 28 (FIG. 2) is pivotally mounted on frame members 14, 18 adjacent upper ends 22, 24 respectively. As perhaps best shown in FIG. 3, bar 28 extends generally horizontally away from the frame members in a disposition which it maintains when the rack is moved between the inclined and declined positions. A clamping member (FIGS. 3 and 4) is mounted on bar 28 and includes first and second halves 28a, 28b and a lock 28c for locking the halves together. The halves are configured for clamping a tubular portion of a bicycle(s) frame as shown, and may be manipulated as shown in FIG. 4 for effectuating the clamping. FIG. 4 also shows an extension (not specifically designated) which may be connected to bar 28 so that additional bicycles may be carried. Each of the above-mentioned components will now be described in more detail, starting first with hitch mount 12.

FIGS. 2, 3, 6–8, and 9A–9H collectively, show hitch mount 12 in more detail. As will become apparent after the description below is read, hitch mount 12 is expandable so that once it is inserted into hitch sleeve H, it may be expanded to substantially engage all of the interior surfaces of the hitch sleeve or opposite interior hitch sleeve corners, thereby greatly reducing or eliminating the rack's tendency to wobble when carried on a vehicle. In the preferred embodiment, hitch mount 12 includes an elongate, multi-sided tubular member or coupling tube 32 with a first or distal end 34 (FIG. 2) which is insertable into hitch H, and an exposed second end 36 which extends away from hitch H when first end 34 is so inserted. Preferably, coupling tube 32 is generally square in transverse cross-section for accommodating insertion into similarly-cross-sectioned hitch sleeves. Accordingly, the coupling tube has four flat sides 38, 40, 42, 44, (FIG. 2) and each side defines an outer abutment surface for reasons which will become evident below. Each outer surface lies in a plane which is different from a plane in which any other outer surface lies, and each plane is generally parallel to the coupling tube's long axis A which is shown in FIG. 2. Further, each plane defined by an abutment surface is generally orthogonal to an adjacent abutment surface plane, and generally parallel to an opposite abutment surface plane.

Figure 9A:
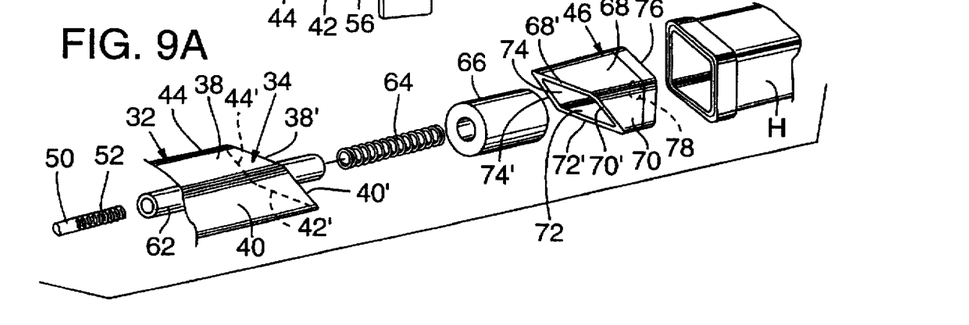
FIG. 9A is an isometric exploded view of an end portion of a hitch mount according to the preferred embodiment of the invention.
Figure 9B:
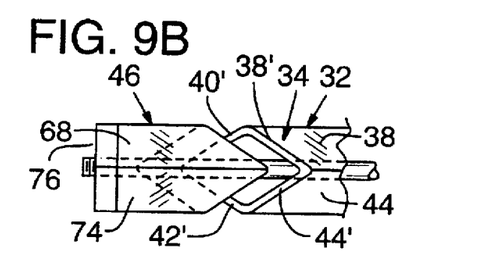
FIG. 9B is a plan view of an end of the hitch mount, as viewed along a corner thereof, showing two parts of the hitch mount which are engaged for movement relative to one another.

As shown most clearly in FIGS. 9A–9B, each side terminates adjacent first end 34 at a respective edge 38', 40', 42', 44'. The aggregate of the edges defines a continuous edge or polygon which lies in a plane which is oblique with respect to any of the planes in which an outer surface of any side lies. By "oblique" is meant that the plane defined by the continuous edge is neither parallel nor perpendicular to any of the planes defined by any of the outer surfaces. For purposes of clarity, such a plane P is depicted in FIG. 9G which is parallel to the plane defined by the just-mentioned continuous edge. It may be seen from that figure that the plane is oblique with respect to each of the outer surfaces mentioned above which is important for the purpose of effecting a displacement which takes place interiorly of the hitch sleeve and which is directed to substantially reducing or eliminating a wobbling problem experienced by most, if not all vehicle-mounted racks.

Another way of describing hitch mount 12 is to first recognize that the hitch mount is an expandable, elongate coupling tube having a generally square transverse cross-section which is adapted for insertion into a complementary-shaped hitch sleeve. The adaptation which allows the hitch mount to expand and substantially reduce or eliminate the tendency of a rack to wobble comes in the form of a corner-to-corner diagonal slice through the tube which divides the tube into two separate parts, a first member tube part (referred to above as coupling tube 32), and a second member tube part 46 which is described below. The slice is parallel to plane P in FIG. 9G and preferably commences at one of the tube corners and terminates at the non-adjacent tube corner defining a diamond shape or parallelogram which, in turn, defines a slide plane which is skewed relative to each of the tube's sides. The term "skewed," just used, relates to the fact that the slide plane is oblique relative to each of the tube's sides or each of the planes defined by any tube side outer surface. The slide plane allows tube parts 32, 46 to be displaced, relative to one another, interiorly of the hitch sleeve for effectively expanding the mount and engaging, in part, opposite interior hitch corners in a manner described in more detail below.

Figure 6:
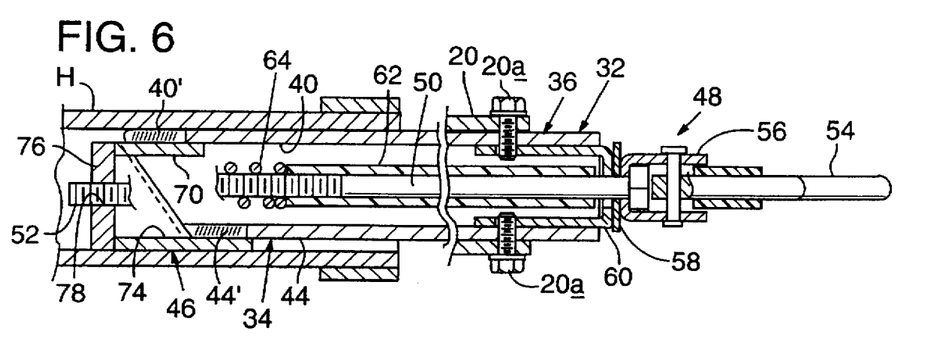
FIG. 6 is a view taken along line 6—6 in FIG. 3, only with a central portion broken away.

An advancement member or actuator 48 preferably includes, as shown in FIG. 6, an elongate screw member 50. Member 48 extends axially through coupling tube 32 in an end-to-end fashion and jointly engages tube parts 32, 46 for effectuating displacement along the slide plane mentioned above. Screw member 50 includes a threaded end 52 which extends adjacent first end 34 and is threaded for a purpose which will become evident below. Actuator 48 includes a handle 54 operatively connected to screw member 50 via a mounting bracket 56, a washer 58, and a generally U-shaped spacing member 60 which is configured for insertion into the end of coupling tube 32. The mounting bracket 56 enables an individual to both impart rotational force to screw member 50 via handle 54, and lock handle 54 in place so that the hitch mount is not stolen. Handle 54 may be locked by a conventional lock (shown in FIG. 2), because the handle is pivotally mounted on the mounting bracket 56 for movement between a position in which it can be used to rotate screw member 50 (FIG. 3), and a position in which it may be locked into place (FIG. 2).

FIG. 9A shows a portion of the hitch mount in exploded fashion where a protective cylindrical sleeve 62 may be seen to protect a portion of the screw member. A spring 64 biases the protective sleeve toward handle 54, and a cylindrical insulating foam member 66 includes a longitudinally-disposed bore for receiving and cushioning screw member 50 and keeping it centered within the tube parts 32, 46.

FIG. 9A further shows that second member tube part 46 forms a multi-sided wedge or wedge member having sides 68, 70, 72 and 74 which correspond to sides 38, 40, 42 and 44 respectively, of first member tube part 32. Tube part 46 includes an end wall section 76 having threaded structure disposed therein, in the form of an aperture 78 having complementary threads for threadably receiving the actuator's threaded end portion 52. This manner of mounting the wedge on the actuator enables the actuator to advance the wedge reciprocally, along axis A, for the purpose of effecting a relative displacement along the oblique slide plane P which exists between member 32 and wedge 46 interiorly of hitch sleeve H. The effective relative displacement between the two is made possible by first, the joint operative engagement between the actuator and both wedge 46 and member 32, and second, a complementary wedge/member interface along the slide plane referred to above. It will be appreciated, however, that any manner of effecting the joint operative engagement between wedge 46 and member 32 would suffice and that what is important with respect to the wobble-reducing feature of the invention is the ability of the hitch mount to engage all of the interior hitch sleeve surfaces or opposite interior hitch sleeve corners.

Figure 9C:
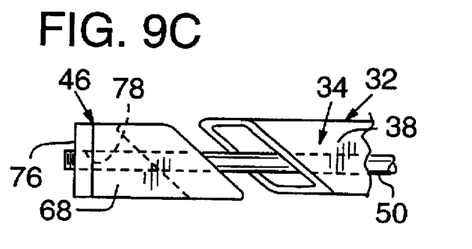
FIGS. 9C–9D are top plan views of the end of the hitch mount, showing the two parts of FIG. 9B engaged for movement but separated from one another (FIG. 9C), and engaged for movement and displaced from one another (FIG. 9D).
Figure 9D:
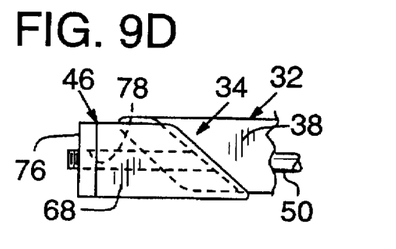
Figure 9E:
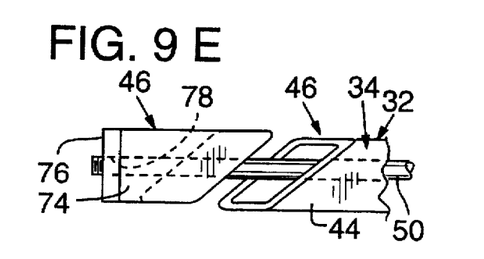
FIGS. 9E–9F are side plan views of the end of the hitch mount which are similar to FIGS. 9C–9D, showing the two parts of FIG. 9B engaged for movement but separated from one another (FIG. 9E), and engaged for movement and displaced from one another (FIG. 9F).
Figure 9F:
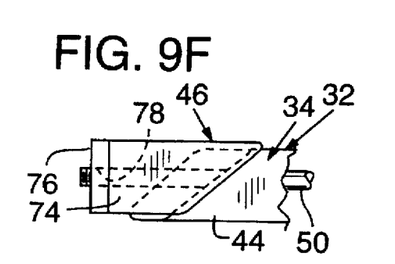
Figure 9G:
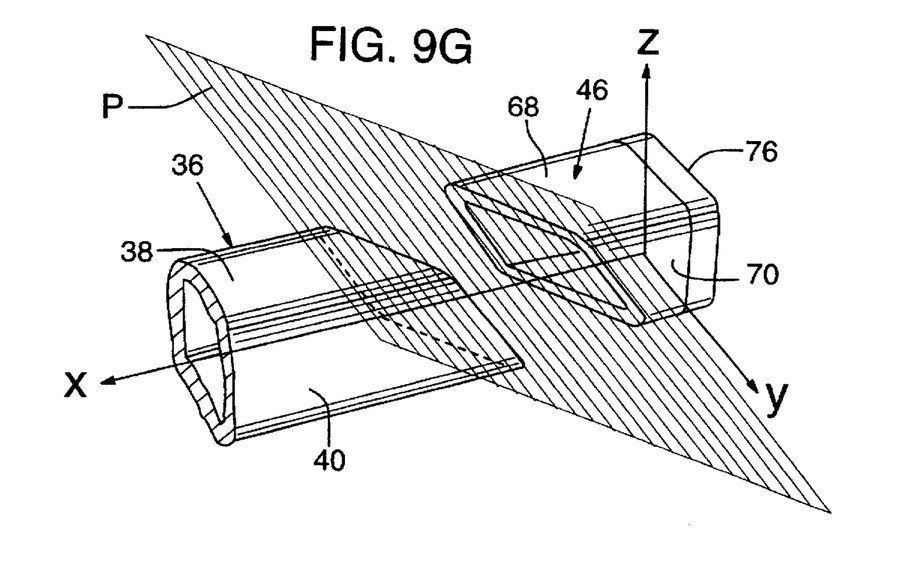
FIG. 9G is an isometric view of the two hitch mount parts shown in FIGS. 9B–9F superimposed on an XYZ coordinate system for the purpose of illustrating a slide plane along which the parts may be displaced.

Referring to FIGS. 9A–9G, and more specifically to such interface, the reader will see that wedge 46 includes a similarly-profiled, complementary-shaped continuous edge (complementary, that is, to the continuous edge of member 32 discussed above), which faces the continuous edge of member 32. The respective edges defining the wedge's continuous edge may be seen in FIG. 9A at 68', 70', 72' and 74'. The two so-called continuous edges confront one another in a sliding engagement which effects a simultaneous, transverse displacement in four directions in which the mount, through the cooperation of wedge 46 and member 32, substantially bears against or engages each of the inner surfaces of the hitch or hitch sleeve as shown in FIG. 7. More specifically, as actuator 48 draws wedge 46 closer to tube 32, the respective edges of each engage one another and the two parts are displaced effectively in four directions. This displacement is shown best in FIGS. 9C–9F where FIGS. 9C and 9D represent views along line 9D—9D in FIG. 2 which are top views of the tube parts in a disengaged position (FIG. 9C) and an engaged position (FIG. 9D), and FIGS. 9E and 9F which represent views along line 9F—9F in FIG. 2 which are side views of the tube parts in the disengaged position (FIG. 9E) and the engaged position (FIG. 9F).

FIG. 7 shows the effect of the above-mentioned four-way displacement where it will be appreciated that as wedge 46 and member 32 engage one another, wedge 46 moves upward and to the right and engages the upper right hitch sleeve corner as well as the upper and right-most interior hitch sleeve surfaces as viewed in FIG. 7. Wedge 46, by virtue of its diagonally upward and outward movement, urges member 32 downward and to the left so that member 32 engages the opposite interior hitch sleeve corner, as well as the lower and left-most interior hitch sleeve surfaces as viewed in FIG. 7. This greatly reduces, if not eliminates completely any tendency of an article-carrying rack to wobble due to shifting or lateral displacement internally of the hitch sleeve. This is because with each of the interior hitch sleeve corners and interior hitch sleeve surfaces engaged by the mount, there is simply no room for the mount to move.

Turning now to a discussion of the preferred release mechanism or latch member, the reader will recall that frame members 14, 18 are pivotally mounted on hitch mount 12 and extend generally upwardly terminating adjacent respective upper ends, adjacent which is mounted a latch member 26, thusly named for its ability to latch the frame members (and hence the rack), in either of the inclined or declined positions. Describing the preferred structural components for implementing latch member 26, the reader's attention is directed to FIGS. 2, 3A–3B, and 5 collectively, where the reader will see that the latch member includes plate structure connected adjacent the upper ends 22, 24 of frame members 14, 18 respectively, generally in the form of two plates, both of which are designated at 80, for maintaining the frame members in a spaced, parallel relationship when the rack is moved between the inclined and declined positions. Preferably, the plates, which are mounted on either side of the frame members (FIG. 5), are generally flat and are mirror images of one another.

Each plate includes a pair of slots 82, 84. Both slots define a path between the inclined and declined positions. Slot 82 accommodates bar 28 and ensures that it maintains its horizontal disposition when the rack is moved between positions. Slot 84 defines, in part, the upper extent of the inclined position, and the lower extent of the declined position. Such upper and lower extents, it will be understood, define the upper and lower limits respectively, to which the rack may be moved. Preferably, each slot 84 includes a first and second capture region 86, 88 (respectively in FIGS. 3A–3B), in the form of a generally upturned cove which enables the latch member to effectively latch the rack in the inclined or declined positions. To that end, a detent 90, preferably in the form of a pin, passes through frame member 18 and includes ends which engage slots 84 on either side of the frame member for selectively locking the rack at either one of the extents described above. The upper extent is shown in FIG. 3 in phantom lines where detent 90 may be seen to be engaged in capture region 86. FIG. 3 shows, in solid lines, detent 90 engaged in capture region 88 which locks the rack at the lower extent. Both of the capture regions effectively confine the rack in either of the inclined or declined positions so that, in the inclined position, articles may be effectively carried from one place to another by a vehicle, and in the declined position, articles may be loaded or unloaded from the rack and placed on the ground in a manner which minimizes the distance an article must travel to and from the rack. As may best be seen in FIG. 2, each plate is joined to the other by a series of four cylindrical connection members 92, 94, 96 and 98. The connection members bind the tops of the plates together and maintain the plates in a rigid configuration. A handle 100 is preferably mounted between the plates and held in place by connection members 96, 98. A spring 102 includes an end which is hooked around connection member 96, and another end which is attached to frame member 18. The spring biases the plates downwardly so that in order to release the rack from its locked, inclined or declined position, an individual must lift up on the handle (FIG. 3B) so that pin 90 is released from one of the coves which captures it. This completely eliminates the possibility of an inadvertent or accidental release by requiring that an individual lift upwardly on the handle to unlock the rack.

The following dimensions have been found suitable for constructing a rack according to the preferred embodiment. The length of hitch mount 12, from end-to-end is preferably around 15-inches. This allows enough of the mount to be inserted into hitch H so that when the mount is expanded, it abuts enough of the interior hitch wall surface area to prevent the rack from wobbling. Each of frame members 14, 18 is preferably around 32-inches in length which enables articles to be carried a sufficiently safe distance above the ground. As mentioned above, the frame members are preferably square in transverse cross-section, and each side of the square is around 1.5-inches. Each side of the U-shaped support bar 28 is preferably around 25-inches in length giving the bar itself an unbent length of around 55- to 60-inches.

Figure 9H:
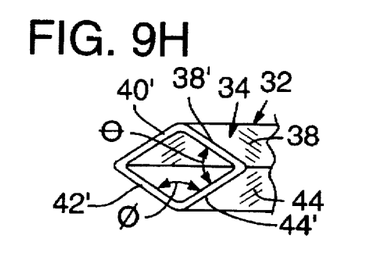
FIG. 9H is a plan view of an end of one of the hitch mount parts which illustrates some preferred dimensions.

FIG. 9H shows the end of first member tube part 32, and more particularly the diamond-shaped edge profile defined by the ends of each of the sides, two sides of which are indicated at 38, 44 respectively. Indicated at $\Theta$ and $\phi$ are the respective angles defined by edges 38', 44' and 42', 44' which lie in the slide plane described above. Preferably, $\Theta$ has a value of between 60°–70°, and $\phi$ has a value of between 110°–120°. It will be understood that opposite interior angles are equivalent, and that tube part 46 includes similarly-angled edges. It will also be understood that the above-mentioned dimensions are preferred only, and not meant to limit the invention in any way. To that end, other racks having various dimensions, e.g., $\Theta$ and $\phi$, and the like, are within the spirit and scope of the invention. Additionally, the aforementioned slide plane, shown at P in FIG. 9G, intersects the plane defined by end wall section 76 along an intersection line such that an angle between two other lines, each one lying in a respective one of the planes and perpendicular to the intersection line defines an angle of between 50°–60°.

In the preferred embodiment, the rack is configured for carrying bicycles thereon and enables a user to simply, and with minimal effort, unload a carried bicycle.

In Operation

In operation, the invention provides an article-carrying rack which is easily mountable on a vehicle, preferably by virtue of a hitch mount which is easily insertable into a conventional vehicle hitch sleeve. It will be appreciated, however, that the rack could be mounted on other parts of a vehicle such as the front, with minor modifications to the hitch mount. The invented rack is safe and simple to use by virtue of its construction which enables the rack to be moved by a single individual from an inclined position for carrying articles to a declined position for loading and unloading the articles. The declined position minimizes the distance an individual must lift an article to and from the rack. The rack is equipped with an improved release mechanism or latch which is easily accessible and eliminates the possibility that the rack will be inadvertently released from the inclined position. This is because, according to the preferred embodiment, a handle on the latch must be moved upwardly and the force of a downwardly biasing spring overcome in order to release the latch. One feature of the invented rack which is particularly useful is the so-called wobble-reducing hitch mount which ensures that a carried load is not shifted or laterally displaced due to any hitch mount movement within the vehicle hitch sleeve.

Briefly summarizing, an articulable, hitch-sleeve-mounted, wobble-resistant, article-carrying rack and hitch mount have been described. The rack is movable from an inclined position for carrying articles, to a declined position in which the carried articles may be removed. The rack includes a hitch mount which is insertable into a vehicle's hitch and is adapted for engaging the hitch internally thereof for reducing the tendency of the rack to wobble. First and second elongate frame members are pivotally mounted on the hitch mount, and each includes an upper end longitudinally spaced from the hitch mount. The second frame member is spaced from, and maintained in a generally parallel relationship with the first frame member. A latch member connects the upper ends of the frame members and locks the frame members in either of the inclined or declined positions. At least one support bar is pivotally mounted on the frame members adjacent the upper ends thereof and extends generally horizontally away therefrom for supporting articles thereon. The support bar is mounted in such a way that it maintains its horizontal disposition when the rack is moved between the inclined and declined positions.

While the present invention has been shown and described with reference to the foregoing preferred embodiment, it is to be understood by those skilled in the art that other changes in form and detail may be made without departing from the spirit and scope of the invention as defined in the appended claims.

I claim:

1. A wobble-reducing vehicle hitch mount for attaching an article carrier to a square cross-sectioned hitch sleeve with a generally square transverse cross section defining opposite interior hitch sleeve corners, comprising:

an expandable, elongate coupling tube having a generally square transverse cross-section, adapted for insertion into a square cross-sectioned hitch sleeve, the square cross section of the coupling tube being substantially defined by four approximately planar outer surfaces adapted for expansion once inserted into a square cross-sectioned hitch sleeve for selectively locking the mount in place, the coupling tube including, a diagonal slice through the tube dividing the tube into two separate parts, the slice commencing at one of the tube corners and terminating at the non-adjacent tube corner to define a slide plane which is skewed relative to each of the tube's sides so that the intersection between the slide plane and the four outer surfaces of the tube defines at least a substantial portion of a non-rectangular parallelogram, and along which the tube parts may be displaced, relative to one another, interiorly of the hitch sleeve for effectively expanding the tube parts and engaging the tube parts at least partially with opposite interior hitch sleeve corners, and an actuator jointly engaging the tube parts for effectuating tube-part displacement along the slide plane.

2. The mount of claim 1, wherein when the coupling tube is inserted into the hitch sleeve, a first of the tube parts includes an end which extends away from the hitch sleeve, and a second of the tube parts is completely enclosed by the hitch sleeve.

3. The mount of claim 2, wherein the actuator includes an elongate screw member which extends generally axially through the tube and includes a first end for engaging the second tube part.

4. The mount of claim 3, wherein the screw member's first end includes a threaded region, and the second tube part includes complementary threaded structure for engaging the screw member's threaded region for enabling the second tube part to be displaced along the slide plane.

5. The mount of claim 4, wherein the second tube part includes an end wall and the second tube part's threaded structure is disposed in the end wall for receiving the screw member's threaded region.

6. The mount of claim 4, wherein the actuator includes a handle connected to the screw member for enabling the application of a rotational force for rotating the screw member and effectuating the above-mentioned slide plane displacement.

7. For use with an elongate, vehicle-mounted hitch sleeve which has a plurality of interior hitch sleeve surfaces and a generally square transverse cross-section, an expandable hitch mount adapted for insertion into the hitch sleeve comprising:

a first member having plural abutment surfaces; and a second member having plural abutment surfaces, the members being operatively connected to one another for movement relative to one another for bringing the abutment surfaces to bear against the interior hitch sleeve surfaces such that each surface of the plurality of interior hitch sleeve surfaces may be substantially engaged under pressure by a respective one of the abutment surfaces.

8. The hitch mount of claim 7, wherein each member includes two abutment surfaces, and each abutment surface on a member defines a plane which is generally orthogonal to the other.

9. The hitch mount of claim 8, wherein the members are movable in opposite directions for engaging the interior hitch sleeve surfaces.

10. The hitch mount of claim 8, wherein the members are movable along a plane which is skewed relative to each of the planes defined by any of the abutment surfaces.

11. In a vehicle-mounted, article-carrying rack which may be moved from a generally inclined position for carrying articles, to a generally declined position in which such carried articles may be removed, and which includes at least two frame members having bottom ends mounted adjacent a vehicle, and top ends spaced therefrom, an improved latch member for fixing the rack in either of the inclined or declined positions comprising:

plate structure connected to the frame members adjacent the top ends of the frame members for maintaining the frame members in a spaced, generally parallel relationship when the rack is moved from and between the inclined and declined positions;

a detent formed on one of the frame members; and at least one slot in the plate structure for movably receiving the detent within the slot, the slot and detent configured for selectively locking the rack in either the inclined position, or the declined position, such inclined and declined positions defining, respectively, the upper and lower limits to which the rack may be moved.

12. The latch member of claim 11, wherein the frame members are pivotally mounted on a vehicle and a first of the frame members is mounted forwardly of a second of the frame members relative to the vehicle's central axis, and further wherein the plate structure includes two plates pivotally connected to the frame members to maintain the frame members in a spaced, parallel relationship when the rack is moved between the inclined and declined positions.

13. The latch member of claim 11, wherein the slot is elongate and maintains a generally-horizontal orientation when the rack is moved between the inclined and declined positions, and further wherein the slot includes a capture region at each end which is defined, in part, by a generally upturned cove for receiving the detent.

14. In a vehicle-mounted, article-carrying rack which may be moved from a generally inclined position for carrying articles, to a generally declined position in which such carried articles may be removed, and which includes at least two frame members having bottom ends mounted adjacent a vehicle, and top ends spaced therefrom, an improved latch member for fixing the rack in either of the inclined or declined positions comprising:

plate structure connected to the frame members adjacent the top ends of the frame members for maintaining the frame members in a spaced, generally parallel relationship, when the rack is moved from and between the inclined and declined positions;

a detent formed on one of the frame members; and at least one slot in the plate structure for movably receiving the detent within the slot, wherein the slot includes a first capture region for capturing the detent and locking the rack in the inclined position, and the slot also includes a second capture region spaced from the first capture region for capturing the detent and locking the rack in the declined position.

15. The latch member of claim 14, wherein each of the plates includes a similarly-configured slot and the detent includes two ends, each of which engages a respective one of the slots.

16. The latch member of claim 15, wherein the plates are mirror images of one another.

17. The latch member of claim 14 further comprising a spring-biased handle connected to the plate structure for enabling a user to move the plate structure and disengage the detent from one of the capture regions of the slot when the rack is locked in one of the positions, thereby unlocking the rack.

18. The latch member of claim 17, wherein the detent may be disengaged from the one of the capture regions of the slot by applying an upward force on the handle.

19. An articulable, hitch-sleeve-mounted, wobble-resistant, article-carrying rack which is movable from an inclined position for carrying articles, to a declined position in which such carried articles may be removed, comprising:

a hitch mount which is insertable into a vehicle's hitch and adapted for engaging the hitch internally thereof for reducing the tendency of the rack to wobble;

a first elongate frame member pivotally mounted on the hitch mount, having an upper end longitudinally spaced therefrom;

a second elongate frame member pivotally mounted on the hitch mount, having an upper end longitudinally spaced therefrom, the second frame member being spaced from the first frame member in a generally parallel relationship therewith;

a latch member connecting the upper ends of the frame members for locking the frame members in either the inclined or declined positions; and at least one support bar pivotally mounted on the frame members adjacent the upper ends and extending generally horizontally away from the upper ends for supporting articles thereon and for maintaining its horizontal disposition when the rack is moved between the inclined and declined positions;

wherein the frame members are generally tubular and have a generally square transverse cross-section.

20. The rack of claim 19, wherein the hitch mount comprises, an expandable, elongate coupling tube having a generally square transverse cross-section, adapted for insertion into a hitch having a square transverse cross section complementary to the cross section of the tube, and thereafter being expandable for selectively locking the mount in place, the coupling tube including, a diagonal slice through the tube dividing the tube into two separate parts, the slice commencing at one of the tube corners and terminating at the non-adjacent tube corner to define a slide plane which is skewed relative to each of the tube's sides, and along which the tube parts may be displaced, relative to one another, interiorly of the hitch for effectively expanding the tube parts relative to each other, and engaging with the tube parts at least a portion of opposite interior hitch corners, and an actuator jointly engaging the tube parts for effectuating tube-part displacement along the slide plane.

21. An articulable, hitch-sleeve-mounted, wobble-resistant, article-carrying rack which is movable from an inclined position for carrying articles, to a declined position in which such carried articles may be removed, comprising:

a hitch mount which is insertable into a vehicle's hitch and adapted for engaging the hitch internally thereof for reducing the tendency of the rack to wobble;

a first elongate frame member pivotally mounted on the hitch mount, having an upper end longitudinally spaced therefrom;

a second elongate frame member pivotally mounted on the hitch mount, having an upper end longitudinally spaced therefrom, the second frame member being spaced from the first fame member in a generally parallel relationship therewith;

a latch member connecting the upper ends of the frame members for locking the frame members in either the inclined or declined positions; and at least one support bar pivotally mounted on the fame members adjacent the upper ends and extending generally horizontally away from the upper ends for supporting articles thereon and for maintaining its horizontal disposition when the rack is moved between the inclined and declined positions;

wherein the latch member includes at least one plate, an arcuate slot disposed in the plate, and a pin connected to a frame member, wherein the slot is configured for receiving the pin and engaging the pin for locking the rack in the inclined or declined positions.

22. The rack of claim 21 further comprising a handle connected to the plate for disengaging the pin and unlocking the rack.

23. An articulable, hitch-sleeve-mounted, wobble-resistant, article-carrying rack which is movable from an inclined position for carrying articles, to a declined position in which such carried articles may be removed, comprising:

a hitch mount which is insertable into a vehicle's hitch sleeve and adapted for engaging a hitch sleeve internally thereof for reducing the tendency of the rack to wobble; and at least one support bar mounted on the hitch mount and extending generally horizontally away therefrom for supporting articles thereon;

wherein the hitch mount comprises, an elongate coupling member which extends along a long axis and terminates adjacent a distal end which is insertable into a hitch sleeve;

an advancement member extending axially through the coupling member; and a wedge member engageable by the advancement member for reciprocal axial advancement interiorly of a hitch sleeve, the wedge member having a proximal end which faces the coupling member's distal end for engaging the same and thereby effecting a relative displacement between the coupling member and wedge member interiorly of a hitch sleeve, the distal and proximal ends each having complementary, diamond-shaped profiles such that the effected displacement between the coupling member and the wedge member takes place in four directions simultaneously, each direction being different from the other and extending generally radially outwardly of the long axis.

24. The rack of claim 19, wherein the hitch mount comprises, an elongate, multi-sided tubular member having a first end which is insertable into a vehicle's hitch, the hitch having plural inner surfaces, and the tubular member having a second end which extends away from the hitch when the first end is so inserted, wherein each of the member's sides includes an outer surface which lies in a plane which is different from a plane in which any other outer surface lies, and wherein each plane is generally parallel to the member's long axis, and further wherein each side terminates adjacent the first end at a respective edge the aggregate of which defines a polygon which lies in a plane which is oblique with respect to each of the planes in which any surface of any side lies;

an actuator extending through the member from end-to-end, having a portion which extends adjacent the member's first end; and a multi-sided tubular wedge mounted on the actuator adjacent the member's first end for reciprocal movement along the member's long axis, the wedge including edges defining a complementary-shaped polygon which faces the member, the wedge being movable by the actuator for bringing the respective polygons into confronting, sliding engagement for effecting a simultaneous, transverse displacement between the member and the wedge in which the mount substantially bears against each inner surface of the vehicle's hitch.

* * * * *